United States Patent [19]

Grome et al.

[11] Patent Number: 5,052,593
[45] Date of Patent: Oct. 1, 1991

[54] APPARATUS FOR DISPENSING COMESTIBLES HAVING A REVERSIBLE PISTON ROD ASSEMBLY

[75] Inventors: Donald C. Grome, Edmonds, Wash.; Paul P. Kolada, Bexley; Rainer B. Teufel, Columbus, both of Ohio

[73] Assignee: Hamilton Beach/Proctor-Silex, Inc., Glen Allen, Va.

[21] Appl. No.: 457,319

[22] Filed: Dec. 28, 1989

[51] Int. Cl.$^5$ .............................................. B65D 88/54
[52] U.S. Cl. .................................... 222/333; 222/390
[58] Field of Search ............... 222/158, 326, 327, 333, 222/386, 390

[56] References Cited

U.S. PATENT DOCUMENTS

| | | | |
|---|---|---|---|
| D. 247,414 | 3/1978 | Watkins et al. | D7/99 |
| 3,208,638 | 9/1965 | Frenzel et al. | 222/39 |
| 3,946,908 | 3/1976 | Yoon | 222/162 |
| 3,984,033 | 10/1976 | Groth et al. | 222/333 |
| 4,106,534 | 8/1978 | Johnson | 141/18 |
| 4,114,781 | 9/1978 | Doyel | 222/326 |
| 4,322,022 | 3/1982 | Bergman | 222/327 |

FOREIGN PATENT DOCUMENTS 63462 6/1989 Canada .

OTHER PUBLICATIONS

Advertisements of Braun Hand Blender including brochure published on or about Oct., 1985.

Primary Examiner—Michael S. Huppert
Assistant Examiner—Shari Wunsch
Attorney, Agent, or Firm—Roger S. Dybvig

[57] ABSTRACT

A battery-operated apparatus for dispensing comestibles has a housing to which a comestibles-receiving barrel is removably connected. A removable piston is nonrotatably slidable within the barrel and pushed through the barrel by a piston rod nonrotatably connected to the piston and slidably received within the housing. The piston rod has external screw threads over a substantial portion of its length which are engaged by internal threads of an encircling drive nut. A drive member rotatably mounted in the housing and having a through-bore for slidably receiving the piston rod is provided for rotating the drive nut. The piston rod and the drive nut constitute a reversible assembly so that, following use, the barrel and the piston may be removed from the housing for cleaning and the piston rod with the drive nut thereon may be removed from the housing, turned upside-down, and reinserted into the housing ready for another use. Portions of the piston rod are unthreaded to prevent overtravel, and resilient stop members on the piston rod push the drive nut onto the threaded portion of the piston rod at each end of its travel to assure a threaded connection when the piston rod is reversed.

11 Claims, 3 Drawing Sheets

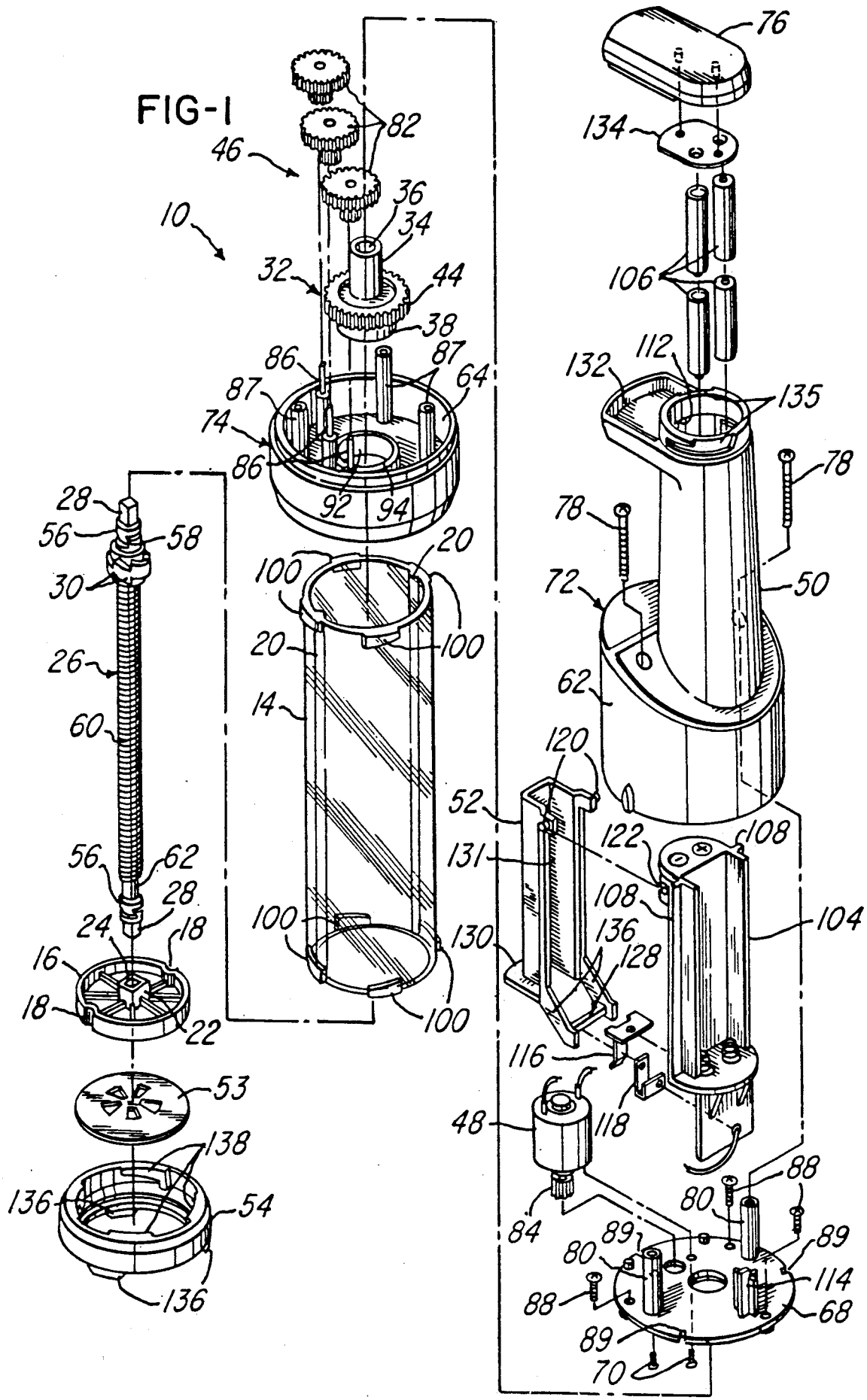

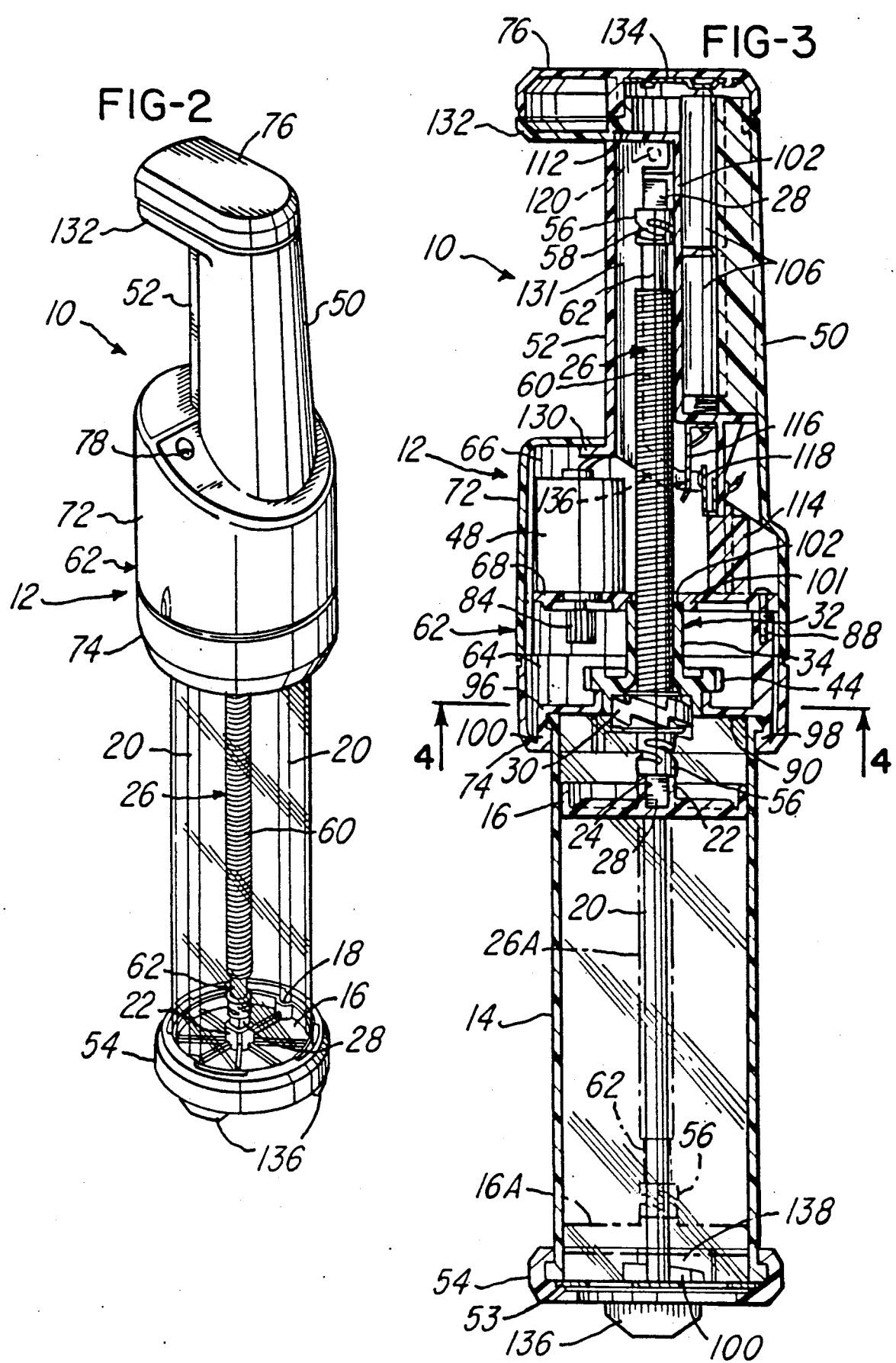

APPARATUS FOR DISPENSING COMESTIBLES HAVING A REVERSIBLE PISTON ROD ASSEMBLY

SUMMARY OF THE INVENTION

This invention relates to apparatus for dispensing comestibles and more particularly to a hand-held, electrically-operated apparatus for dispensing viscous or pasty comestibles, such as cookie dough.

A prior apparatus of the type to which the present invention is directed is disclosed in U.S. Pat. No. 3,984,033. The prior apparatus utilizes a removable piston slidably and nonrotatably arranged in a barrel and urged to travel in the barrel by a rotatable piston rod threadedly engaged in a hole in the piston. Although this prior apparatus has the advantage of being easily dissassembled and reassembled to facilitate sanitary cleaning, a user of the prior apparatus has difficulty in filling and packing the barrel with the desired quantity and density of the comestibles due to the centrally located piston rod. Further, some portion of the comestibles tends to adhere to external threads of the piston rod and to the mating internal threads of the piston. Because of these features of the prior apparatus, it is somewhat messy to use and not so easy to clean as desirable. The difficulty in filling and packing the barrel has previously been recognized, having resulted in the suggestion in U.S. Pat. No. 4,106,534 of a separate filing apparatus for placing comestibles in the barrel around the piston rod.

An object of this invention is to provide an improved apparatus for dispensing comestibles. More particularly, an object of the invention is to provide an improved apparatus for dispensing comestibles which is easier to fill, easier to use, easier to clean, and less messy to use than the apparatus of the U.S. Pat. No. 3,984,033.

An apparatus for dispensing comestibles in accordance with this invention comprises a housing to which a comestibles-receiving barrel is removably connected. A removable piston is nonrotatably slidable within the barrel and pushed through the barrel by a piston rod nonrotatably connected to the piston and slidably received within the housing. The piston rod has external screw threads over a substantial portion of its length which are engaged by internal threads of an encircling drive nut. Drive means rotatably mounted in the housing and having a through-bore for slidably receiving the piston rod is provided for rotating the drive nut. The drive means is itself driven by a motor and gearing.

In the presently preferred embodiment, the drive motor is battery operated and the housing has a lower portion that houses the drive motor and the gearing and an upper portion that forms a hollow handle housing for a battery pack. A switch operating lever of a motor control switch extends longitudinally along the handle portion so that one may conveniently grip the handle with one hand and operate the switch with the same hand.

Further in accordance with this invention, the piston rod and the drive nut constitute a reversible assembly so that, following use, the barrel and the piston may be removed from the housing for cleaning and the piston rod with the drive nut thereon may be removed from the housing, turned upside-down, and reinserted into the housing ready for another use. The drive nut is preferably confined to the piston rod by a pair of resilient stop members, one adjacent to each end of the piston rod, that the drive nut cannot pass over. The stop members are separated from the threaded portion of the piston rod by unthreaded portions of the piston rod. Accordingly, when the piston rod is driven to full extension the drive nut becomes disconnected from the threaded portion so that the drive motor is unable to drive the piston rod any further, and thereby possibly damage the apparatus. However, rather than permitting the drive nut from becoming completely disengaged from the threaded portion, which would require the user to re-thread the drive nut onto the threaded portion when the piston rod is reversed, the stop members are located sufficiently near the ends of the threaded portion that the drive nut engages them and, due to the resiliency of the stop members, is thereby pushed back onto the threaded portion. A threaded connection between the drive nut and the piston rod is thereby assured when the piston rod is reversed.

Other objects and advantages will become apparent from the following description and the drawings.

BRIEF DESCRIPTION OF THE DRAWINGS

FIG. 1 is an exploded perspective view of a dispensing apparatus in accordance with this invention.

FIG. 2 is a perspective view of the dispensing apparatus of FIG. 1 shown assembled.

FIG. 3 is a cross-sectional view on a larger scale of the apparatus of FIGS. 1 and 2.

DETAILED DESCRIPTION

Figure 4:
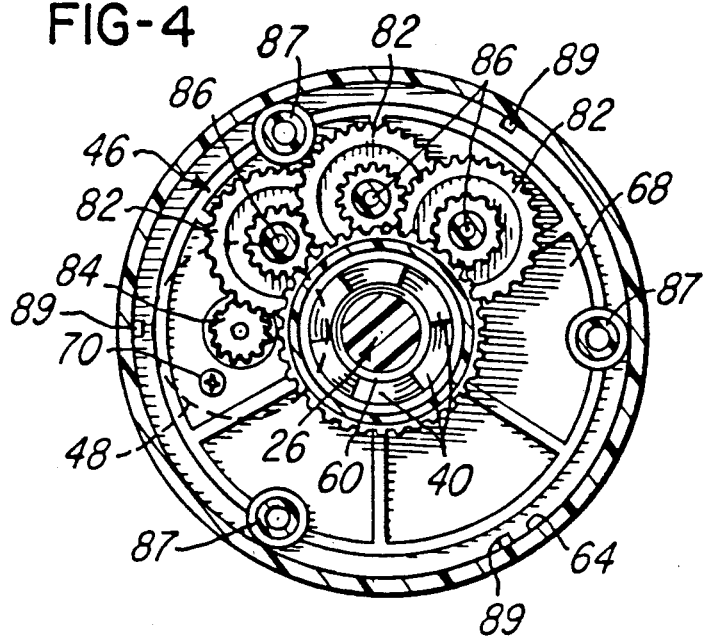
FIG. 4 is a transverse cross-sectional view taken along line 4—4 of FIG. 3.

With reference to FIGS. 1, 2, and 3, an apparatus for dispensing comestibles in accordance with this invention is generally designated 10 and comprises a housing, generally designated 12, to the lower end of which a hollow, tubular barrel 14 is detachably connected. A removable piston 16 is slidable within the barrel 14. Piston 16 has diametrically-spaced, peripheral notches 18 that cooperate with longitudinally extending ribs 20 on the inside of the barrel 14 to prevent rotation of the piston 16. The lower face of the piston 16 is preferably planar and its upper face is provided with a socket 22 having a square or other noncircular opening 24.

Figure 5:
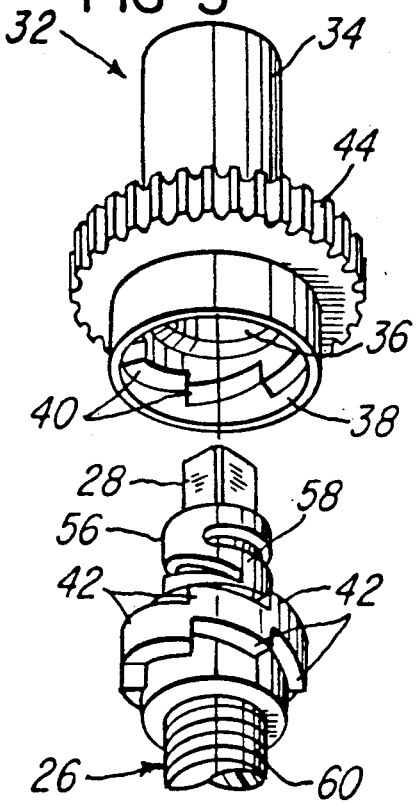
FIG. 5 is a further enlarged exploded perspective view of parts of the dispensing apparatus.

A piston rod, generally designated 26, having square ends 28 adapted to be nonrotatably received within the piston socket 24 is slidably received within the housing 12. The piston rod 26 has external screw threads 60 over a substantial portion of its length which are engaged by internal threads of an encircling drive nut 30. Drive means, generally designated 32, is rotatably mounted in the lower portion of the housing 12 and comprises a sleeve-like hollow body 34 having a through-bore 36 for slidably receiving the piston rod 26 and an enlarged lower end forming a cup-like, drive nut-receiving nest 38 having plural, downwardly projecting, drive teeth 40 adapted to drivingly engage a like number of cooperating, upwardly projecting, driven teeth 42 on the drive nut 30 (FIG. 5). Drive means 32 further includes a circular gear 44 adapted to be driven by gearing, generally designated 46, powered by a battery operated drive motor 48. The upper portion of the housing 12 forms a handle 50 with which is associated a hand-operated switch lever 52 as will be further described below.

In operation, the piston rod 26 with the drive nut 30 near its lower end is slipped into the through bore 36 and the piston 16 is mounted on the short end of the piston rod 26 left projecting from the housing 12. A slotted die or template 53, or optionally a funnel (not shown), is attached to the lower end of the barrel 14 by a die mounting ring 54. The barrel 14 is filled with a suitable comestible, such as cookie dough, and then connected to the housing 12. At this time, the comestible resists downward movement of the piston 16 and thereby holds the piston rod 26 and the drive nut 30 upwardly within the apparatus 10 so that the driven teeth 42 of the drive nut 30 are maintained in engagement with the drive teeth 40 of the drive means 32. The user then grips the handle 50 in one hand, holding the apparatus 10 in the orientation shown in FIG. 2, and manipulates the switch lever 52 with the same hand to energize the drive motor 48, whereupon the drive means 32 rotates the drive nut 30. Because the piston rod 16 is prevented from rotating by virtue of its nonrotatable connection to the socket 22 of the nonrotatably slidable piston 16, such rotation of the drive nut 30 is translated into axial or linear movement of the piston rod 26 and accordingly the piston 16. As a result, the piston 16 is pushed downwardly through the barrel 14, forcing the comestible through the die 53 or the like device. The piston 16 and the piston rod 26, accordingly, are driven from the full line position thereof shown in FIG. 3 to the phantom line positions 16A and 26A of FIG. 3. When the phantom line positions 16A and 26A are reached, the barrel 14 is emptied of comestibles and may be removed from the housing 12 for cleaning and refilling. The piston rod 26 and the drive nut 30 are reversible so that, following removal of the barrel 14 from the housing 20, the piston 16 may be removed from the end of the piston rod 26 for cleaning, and the piston rod 26 may be removed from the housing 12, turned upside-down, and reinserted into the through bore 36. The orientation of the piston rod 26 may thereby be rapidly changed from that shown by phantom lines 26A in FIG. 3 to that shown in full lines in FIG. 3. The driven teeth 42 project in both directions from the body of the drive nut 30 so that a driving connection between the drive means 32 and the drive nut 30 is reestablished when the piston rod 26 is thus reversed.

Drive nut 30 is confined to the piston rod 26 by a pair of plastic stop sleeves 56, one adjacent to each end of the piston rod 26, which are sufficiently large in diametral extent that the drive nut 30 cannot pass over them but sufficiently small to pass through the throughbore 36. The end of each stop sleeve 56 nearest its adjacent square end of the piston rod 26 is affixed to the piston rod 26. The other end of each stop sleeve 56 has spiral webs 58 effective to form springs coiled about the piston rod 26 facing and in spaced relation to the threaded portion 60 of the piston rod 26. The sections, designated 62, of the piston rod 26 between the stop sleeves 56 and its threaded portion 60 are unthreaded and have a smaller diameter than the threaded portion 60. Accordingly, when the piston rod 26 is driven to full extension, i.e., its phantom line position shown at 26A in FIG. 3, the drive nut 30 becomes disconnected from the threaded portion 60 so that it is unable to drive the piston rod 26 any further, and thereby possibly damage the apparatus 10. However, rather than permitting the drive nut 30 from becoming completely disengaged from the threaded portion 60, which would require the user to re-thread the drive nut 30 onto the threaded portion 60 when the piston rod 26 is reversed as described above, the stop sleeves 56 are located sufficiently near the ends of the threaded portion 60 that the drive nut 30 engages the resilient end of the adjacent stop sleeve 56 and is thereby pushed back onto the threaded portion 60 as soon as the drive motor 48 stops operating. A threaded connection between the drive nut 30 and the piston rod 26 is thereby assured when the orientation of the piston rod 26 is reversed.

Housing 12 comprises, in addition to the handle 52, a lower, generally cylindrical, portion 62 that is separated into two compartments, namely, a lower, gear housing compartment 64 and an upper, motor housing compartment 66 (FIG. 3) by a motor mounting plate 68. The motor 48 is mounted on the motor mounting plate 68 as by screws 70 (FIG. 1). For convenience of manufacture, the housing 12 is preferably manufactured from three plastic molded parts, namely a main housing part, generally designated 72, a lower end cap, generally designated 74, and an upper end cap, generally designated 76. The motor mounting plate 68 is connected to the main housing part 72 by self-tapping screws 78 that are threadedly engaged within mounting posts 80 integral with the motor mounting plate 68.

The gearing 46 as shown in FIGS. 1 and 4 comprises three combination gears 82, one of which is engaged by a motor drive pinion 84 on the end of the shaft of the motor 48 and one of which drivingly engages the gear 44 of the drive means 32. The combination gears 82, which are preferably identical to one another, are mounted upon boss-mounted shafts 86 projecting upwardly from the bottom surface of the lower end cap 74. The end cap 74 has upstanding posts 87 connected to the motor mounting plate 68 by self-tapping screws 88. Cooperating grooves 89 at the edge of the mounting plate 68 and ribs (not shown) inside the housing section 72 are used to assure proper orientation of the mounting plate 68.

The lower end face of the lower end cap 74 forms a planar seat 90 having a central circular opening 92 bounded by an upwardly projecting circular flange 94 that provides a bearing for the drive nut-receiving nest 38. The seat 90 is encircled by a downwardly extending coupling ring 96 that has lugs 98 adapted to interfit with cooperating lugs 100 at the ends of the tubular barrel 14 to detachably connect the tubular barrel 14 to the seat 90. When so attached, the longitudinal centerline of the barrel 14 is coincident with the axis of the bore 92 and, accordingly, coincident with the axis of rotation of the drive means 32. The tubular sleeve 34 of the drive means 32 is also confined for rotation within a depending circular flange 101 depending from the motor mounting plate 68 and aligned with a circular bore 102 therein. Accordingly, the drive means 32 is confined for rotation about the axis of the bores 92 and 102. The piston rod 26 and the drive nut 30 are aligned on the same axis by virtue of the interengagement of the drive teeth 40 and the driven teeth 42.

Figure 6:
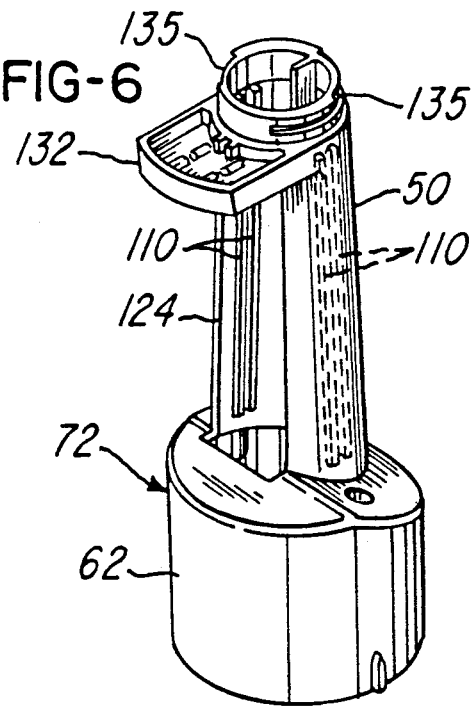
FIG. 6 is a perspective view of a housing portion of the dispensing apparatus.

A battery pack comprising a battery housing 104 and batteries 106 is mounted in the handle 50 of the housing 12, the inside of which is appropriately configured to hold the batteries 104 in the battery housing 102. The battery housing 104 has keys 108 on each side engaged in keyways formed between ribs 110 inside the handle 50 and is otherwise confined in the handle 50 between a downwardly facing shoulder 112 at the top of the handle and a support post 114 projecting upwardly from the motor mounting plate 68. With reference to FIGS. 1 and 3, a pair of vertically-extending switch contacts 116 and 118 are mounted in mutually spaced relation on the battery housing 104. The switch operating lever 52 has laterally extending pins 120 at its upper end that enter notches 122 in the upper end of the battery housing 104 for pivotally suspending the switch operating lever 52. Lever 52 is generally U-shaped in transverse cross section and extends through an elongate vertical opening 124 (FIG. 6) in the handle 50 so that it may be engaged by the user of the apparatus 10. Lever 52 carries switch actuating assembly comprising a pair of transversely extending arms 136 and a cross member 128 spanning between them and engaging the switch contact 116. The lower end of the switch operating lever 52 has a flange 130 confined within the housing section 62. The switch contact 116 is sufficiently stiff or self-biased that it resists movement toward the switch contact 118 but sufficiently flexible that one may grip the handle 50 and squeeze the switch operating lever 52 to cause the cross member 128 to push the switch contact 116 into engagement with the switch contact 118. Upon release of the switch lever 52, the self-biased switch contact 116 becomes disengaged from the switch contact 118 and returns to vertical.

It may be noted that the handle 50 is located in approximate alignment with the rest of the housing 12 and the barrel 14. This is important to enable the handle 50 to house a substantial length of the piston rod 26 when the piston 16 is near the seat 90. Thus, as best shown in FIG. 3, the piston rod 26 extends into an elongate, unobstructed, open compartment 131 in the handle 50, located adjacent the battery pack 104, 106 and the switch operating lever 52 and axially aligned with the through bore 36 of the drive means 32.

The upper end of the handle 52 has a ledge 132 overlying the switch operating lever 52 which helps one to maintain a grip on the lever 52 and which cooperates with the lower housing section 62 to prevent accidental engagement of the switch operating lever which could result in unintended operation apparatus 10. The ledge 132 may also conveniently serve to provide instructions for the location of the batteries 106. The lower surface of the upper end cap 76 has a contact plate 134 pinned thereto for providing proper electrical connection between the two sets of batteries 106. Upper end cap 76 may also have lugs (not shown) adapted to engage in grooves 135 at the extreme top of the housing section 72 to detachably connect the cap 76 to the handle 50.

Figure 7:
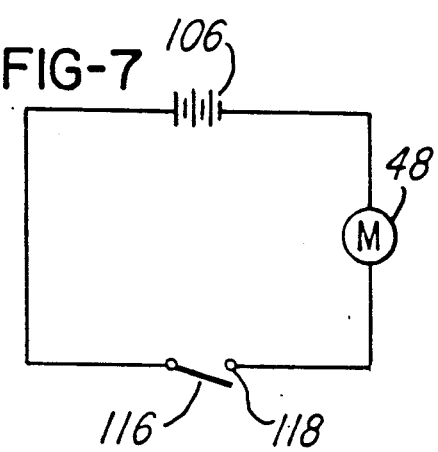
FIG. 7 is an electric circuit diagram of the motor control circuit for the dispensing apparatus.

As shown in FIG. 7, the motor operating circuit may be a simple series circuit comprising the battery 106, the motor 48, and the switch contacts 116 and 118.

For making cookies, the die coupling ring 54 has depending feet 136 that serve as spacers so that one may place the depending feet 136 on a cookie sheet, energize the drive motor 48 to extrude a lump of cookie dough that forms a mound spanned by the depending feet 136, and then deenergize the drive motor 48.

As believed apparent, the dispensing apparatus of this invention may easily be grasped in one hand and held over a cookie sheet and used to rapidly dispense mounds of dough suitable for making cookies. Use of this device is believed easier than the prior device shown in U.S. Pat. No. 3,984,033 because of the freedom of movement of the hand holding the apparatus 10; it is easier and less messy to fill with comestibles; and requires less cleaning because the threaded parts of the apparatus do not come in contact with the comestibles. It is easily assembled because of the bayonet connection between the barrel 14 and lugs 138 on the die mounting ring 54 and the lugs 98 of the coupling ring 96. As with the prior device, the barrel 14 is reversible, one end thereof having the same construction as its other end.

Although the presently preferred embodiment of this invention has been described, it will be understood that within the purview of this invention various changes may be made within the scope of the appended claims.

We claim:

1. Apparatus for dispensing comestibles comprising:
   a. a hollow, tubular barrel;
   b. a housing having a seat for detachably receiving a first end of said barrel and a handle portion for gripping said apparatus;
   c. means for detachably securing said barrel to said seat with the longitudinal centerline of said barrel coincident with a predetermined axis extending perpendicular to said seat;
   d. a removable piston slidably arranged in said barrel and having thereon means for preventing rotation of said piston within said barrel and further having a centrally located socket open to one face thereof;
   e. means on said barrel for preventing rotation of said piston in cooperation with said means on said piston;
   f. a piston rod movable lengthwise in said barrel and having an end shaped for relatively nonrotatable engagement within said socket, said piston rod having external threads extending longitudinally thereof;
   g. drive means rotatably mounted in said housing and having a central bore slidably receiving said piston rod, the center axis of said bore being coincident with said predetermined axis;
   h. power and gearing means within said housing for rotatably driving said drive means about said predetermined axis;
   i. means within said housing for activating said power and gearing means; and
   j. a drive nut confined on said piston rod and having internal threads for engaging said external threads on said piston rod and having surface means thereon drivingly engageable by said drive means so that said drive nut rotates with said drive means to cause said piston rod to be driven linearly along said axis in a direction to cause said piston to be pushed through said barrel away from said seat.

2. The apparatus of claim 1 wherein said handle portion has an elongate compartment axially aligned with said bore that receives said piston rod when said piston is close to said seat.

3. The apparatus of claim 2 wherein said means for activating said power and gearing means comprises a battery pack located within said handle and a switch having a switch operating lever mounted on said handle, and wherein said compartment extends adjacent said battery pack and said switch operating lever.

4. The apparatus of claim 1 wherein said piston rod and said drive nut are removably engaged with said drive means.

5. The apparatus of claim 1 wherein said piston rod and said drive nut are reversibly and removably engageable with said drive means.

6. The apparatus of claim 5 wherein said piston rod has a stop means adjacent both ends thereof for preventing said drive nut from being removed from said ends, and spaced lengths of said piston rod between said threads and said stops are unthreaded to limit axial movement of said piston rod in response to rotation of said drive nut.

7. The apparatus of claim 6 wherein said stop means includes spring means for biasing said drive nut into threaded engagement with said threads.

8. The apparatus of claim 7 wherein each of said stop means comprises a plastic sleeve and said spring means is formed from spiral webs.

9. The apparatus of claim 1 wherein said drive means has a nest removably engaged with said drive nut surrounding said bore, said nest having upstanding surface means for drivingly engaging said surface means on said drive nut.

10. The apparatus of claim 1 wherein said surface means of said drive nut project from opposite surfaces thereof whereby said drive nut is reversibly engagable with said drive means.

11. The apparatus of claim 1 wherein said power and gearing means is located within said housing between said seat and said handle portion.

* * * * *